United States Patent [19]

Blume

[11] 4,129,987

[45] Dec. 19, 1978

[54] HYDRAULIC CONTROL SYSTEM

[75] Inventor: Nicholas C. Blume, Spring Lake Park, Minn.

[73] Assignee: Gresen Manufacturing Company, Minneapolis, Minn.

[21] Appl. No.: 842,453

[22] Filed: Oct. 17, 1977

[51] Int. Cl.² .......................... F15B 11/16; F16H 39/46

[52] U.S. Cl. .......................................... 60/445; 60/452; 60/484

[58] Field of Search ................. 60/445, 451, 452, 484; 137/116.3, 117

[56] References Cited

U.S. PATENT DOCUMENTS

| | | | |
|---|---|---|---|
| 3,099,284 | 7/1963 | Thrap et al. | 137/117 |
| 3,200,832 | 8/1965 | Adams | 137/117 |
| 3,334,705 | 8/1967 | Lam | 180/79.2 |
| 3,411,416 | 11/1968 | Herd et al. | 91/451 |
| 3,532,104 | 10/1970 | Hoen | 137/116 |
| 3,628,557 | 12/1971 | Newborough | 137/116.3 |
| 3,827,453 | 8/1974 | Malott et al. | 137/117 |
| 3,911,942 | 10/1975 | Becker | 137/117 |
| 3,937,129 | 2/1976 | Miller | 91/412 |
| 3,971,216 | 7/1976 | Miller | 60/445 |
| 4,074,529 | 2/1978 | Budzich | 60/445 |

*Primary Examiner*—Edgar W. Geoghegan
*Attorney, Agent, or Firm*—Merchant, Gould, Smith, Edell, Welter & Schmidt

[57] ABSTRACT

The disclosure is directed to a closed center, pressure compensated hydraulic system which uses a multiple section hydraulic control valve in conjuction with a variable output hydraulic pump. The hydraulic control valve has a plurality of independently operable power spools each of which is used to control the flow of hydraulic fluid to a separate hydraulic actuator and load. Each valve section includes an automatic spool positioner which enables the operator to move the valve handle to a preselected position, the power spool thereafter being retained in such position until the actuator completes its stroke. After completion of the stroke, the automatic spool positioner causes the power spool to return to the neutral position. The multiple section hydraulic control valve also includes means for selecting the highest demand or work port pressure, and for controlling the variable output pump as a function of this selected pressure.

6 Claims, 6 Drawing Figures

HYDRAULIC CONTROL SYSTEM

The invention is directed to a multiple-spool hydraulic control valve intended for use in a closed or open center, pressure compensated hydraulic system.

Multiple-spool hydraulic valves are necessary in any hydraulic system having more than one independently operable load. For purposes of efficiency, the hydraulic system operates on a single hydraulic pump which may be of the variable output type, or having a fixed output with a diverting valve connected to return.

Each of the valve spools can be independently operated to direct hydraulic fluid to a load actuator under pressure and at a flow which may be varied as desired. It is now known to use hydraulic flow controllers in connection with each power spool to establish a priority system for use of the pumped hydraulic fluid as a function of load demand.

In the multiple-spool hydraulic control valve that embodies this invention, means are included for selecting the greatest demand or work port pressure of each of the sections, and transmitting this pressure through a signal line to instantaneously control the output level of the variable output pump. This pressure selection system can also be used to control the diverting valve of a fixed output pump, but the variable output pump is preferred because of better control and operating efficiencies.

Additional structural and functional features will become apparent from the drawings, specification and claims.

DESCRIPTION OF THE PREFERRED EMBODIMENT

Figure 1:
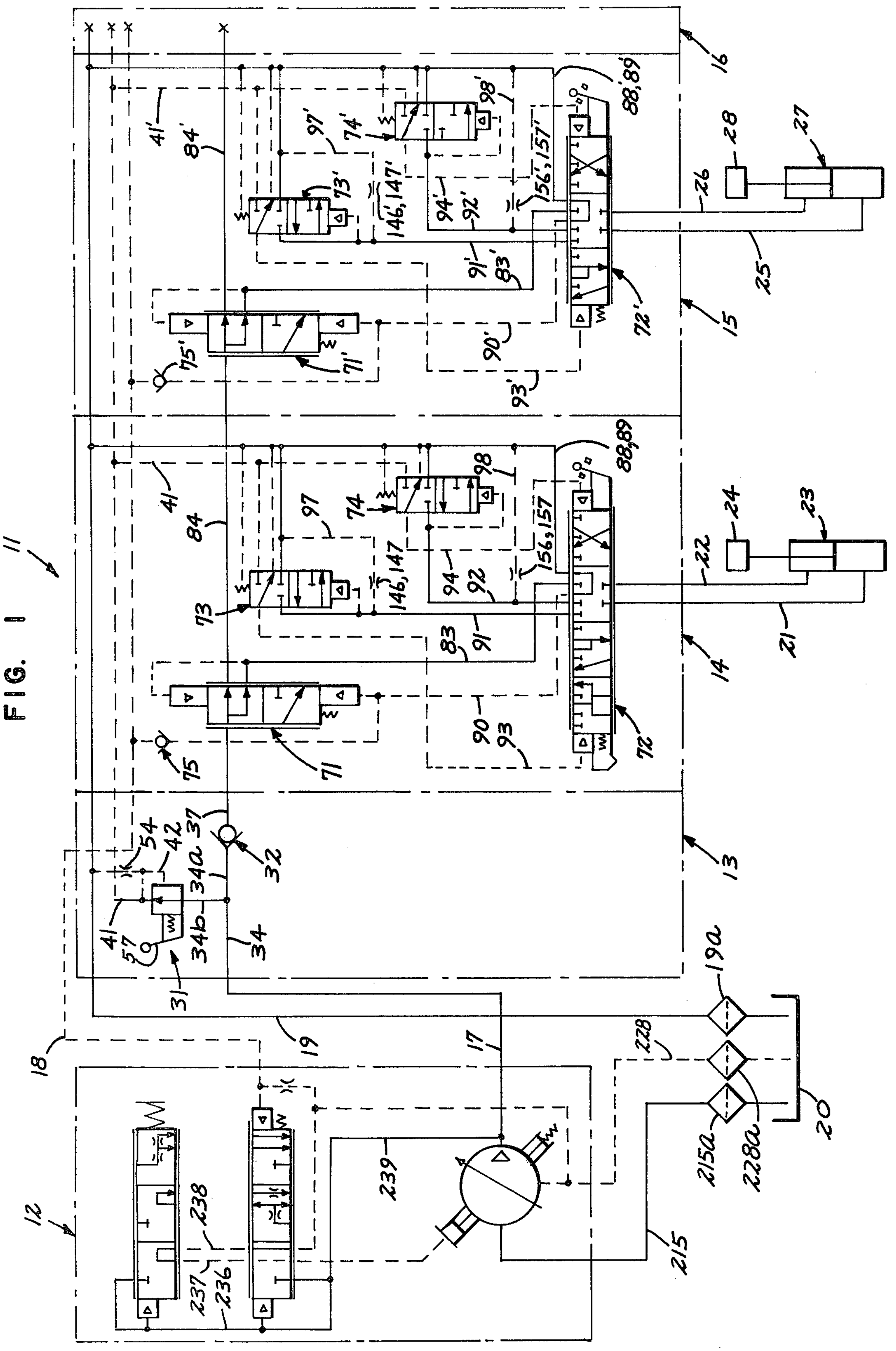
FIG. 1 is a schematic representation of a closed center pressure-compensated hydraulic system including a multiple section hydraulic control valve and a variable output hydraulic pump.

Initial reference is made to the schematic representation of FIG. 1, in which a multiple-spool hydraulic control valve 11 is shown operatively connected to a hydraulic pump 12. As will become apparent below, hydraulic pump 12 is of the variable output type and is capable of sensing the demand of the hydraulic control valve 11. However, it will be appreciated that other types of hydraulic pumps are capable of use with the hydraulic control valve 11; e.g., a fixed output pump with a diverting control valve.

In this preferred embodiment, hydraulic control valve 11 consists of an inlet section 13, a first control section 14 capable of both four-way and float operation, a second control section 15 capable of four-way operation, and an outlet section 16. The multiple section control valve 11 always includes an inlet section 13 and outlet section 16, but is may contain one or more control sections and is not limited to the two sections 14, 15 shown.

A hydraulic line 17 connects the output of the pump 12 with the inlet section 13, and a hydraulic line 18 communicates a demand signal from the inlet section 13 to the pump 12 to control the magnitude of its output. A return line 19 connects the inlet section 13 through a filter 19*a* to a reservoir 20 for hydraulic fluid.

Hydraulic lines 21, 22 connect the control section 14 with opposite sides of a hydraulic actuator 23 to operate a load 24 (e.g., the bucket lift of a front-end loader). Similarly, hydraulic lines 25, 26 connect control section 15 to opposite sides of a hydraulic actuator 27 to operate a load 28 (e.g., the bucket tilt angle of the front-end loader).

The outlet section 16 is simply a cover plate that terminates the hydraulic passages which could otherwise be connected to additional control sections.

With continued reference to FIG. 1, inlet section 13 includes a pressure reducing valve represented generally by the numeral 31 and a load check valve represented generally by the numeral 32, both of which communicate with the hydraulic line 17. Pressure reducing valve 31 includes a manual control which can be operated to render it inoperable.

Figures 2, 3:
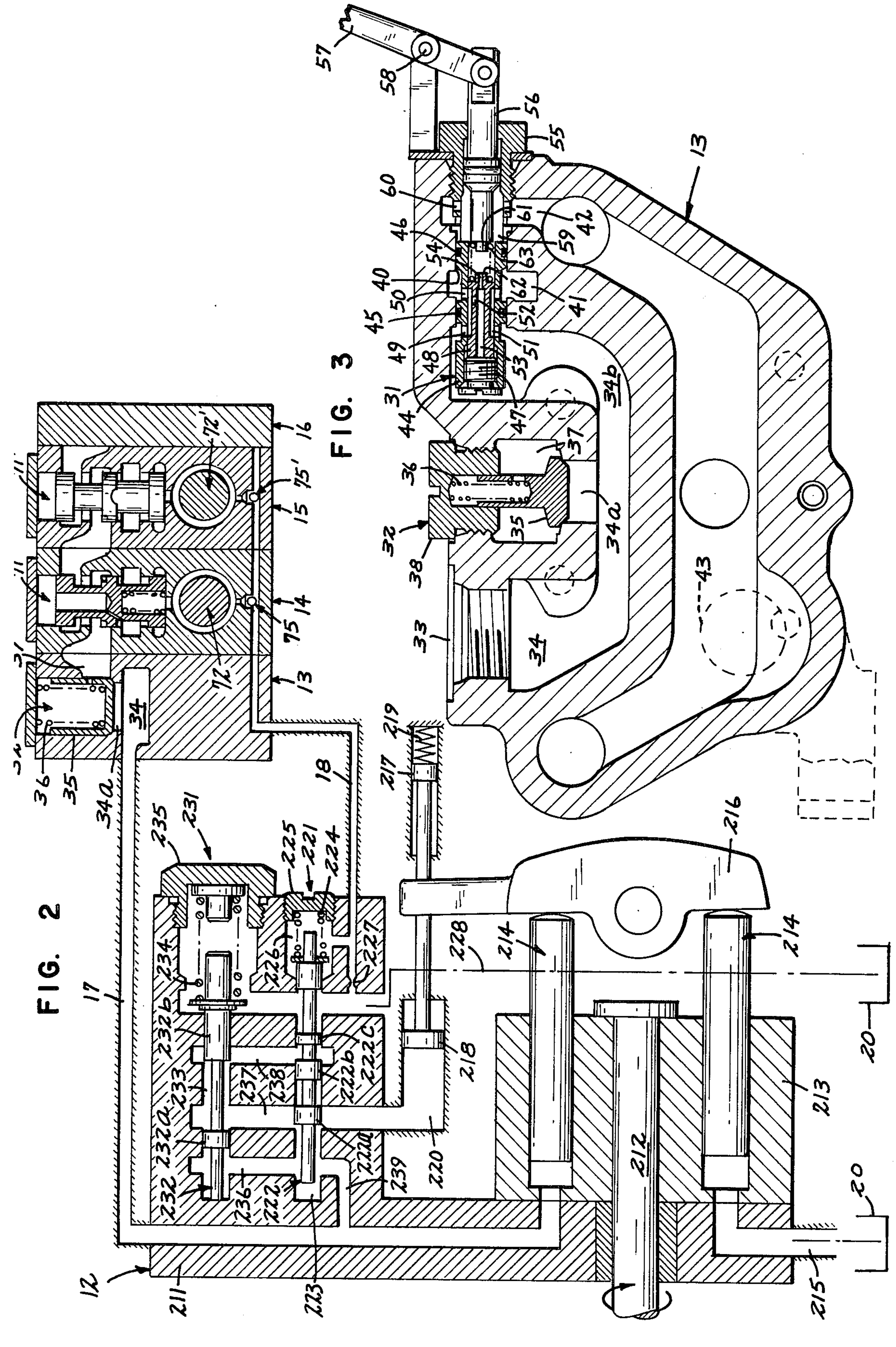
FIG. 2 is a more detailed view of the variable output hydraulic pump and multiple section hydraulic control valve, portions thereof shown in section and other portions being generally diagrammatic.
FIG. 3 is a transverse sectional view of the inlet section of the hydraulic control valve, which includes an inlet check valve and a selectively usable pressure reducing valve.

With additional reference to FIGS. 2 and 3, the hydraulic line 17 enters an inlet 33 in the inlet section 13 which leads to a passageway 34. Passageway 34 subdivides into a passageway 34*a* which leads to the load check valve 32, and a passageway 34*b* which leads to the pressure reducing valve 31.

Load check valve 32 consists of a poppet valve 35 which, under the influence of a spring 36, normally separates passageway 34*a* from a downstream chamber and passage 37. Spring 36 is retained by a screw plug 38. It will be appreciated that poppet valve 35 opens to admit hydraulic fluid into the downstream chamber and passage 37 when pressure in the passageway 34 is greater than the combined force of the spring 36 and pressure in the chamber 37.

With reference to FIG. 3, pressure reducing valve 31 comprises an assembly of parts disposed in a horizontal axial bore 40 formed within the inlet secton 13, the bore establishing common communication between the inlet passageway 34*b*, a pilot line 41 and a return passageway 42 which leads to a return outlet 43. The purpose of pressure reducing valve is to receive hydraulic fluid under varying pressures from the inlet passageway 34*b*, to create a pilot pressure preferably on the order of 150 psi in the pilot passage 41, and to divert unneeded hydraulic fluid to the return passage 42.

To this end, pressure reducing valve 31 comprises a stationary, elongated cartridge 44 which is generally cylindrical in shape. Cartridge 44 seals inlet passage way 34*b* from pilot line 41 by a seal 45, and seals pilot line 41 from return passage 42 by a seal 46. The left end of cartridge 44 as viewed in FIG. 3 is closed by a threaded plug 47, which also serves as a stop for a slidable piston 48.

Cartridge 31 has a first set of radial openings 49 through which hydraulic fluid may enter the cartridge from the passageway 34b, and a second set of radial openings 50 through which hydraulic fluid may leave the center of the cartridge 44 and enter the pilot line 41.

Piston 48 is formed with an elongated surface recess 51 which establishes fluid communication between the radial openings 49, 50. A single radial bore 52 in the piston 48 establishes communication between the recess 51 and a central bore 53 in the piston 48. The extreme right end of the central bore 53 as viewed in FIG. 3 terminates in an orifice 54.

Threadably disposed in the mouth of axial bore 40 is a cap 55 which slidably carries an adjusting rod 56. A manually operable handle 57 is pivotally connected to the right end of adjusting rod 56, and is also pivotally connected to a stationary pivot 58. As such, movement of the handle 57 by an operator causes the adjusting rod to slide in and out within the end cap 55 for the purpose described below.

The extreme left end of the threaded cap 55 sealably abuts the extreme right end of the cartridge 44 to define an internal chamber 59, and a third set of radial openings 60 formed in the threaded cap 55 establishes fluid communication between the chamber 59 and the return line 42.

The extreme left end of adjusting rod 56 has an axially projecting stud 61 the outer diameter of which corresponds to a similar stud 62 on the right end of piston 48 through which the orifice 54 passes. A spring 63 is disposed between the piston 48 and the adjusting rod 56 and is retained by the studs 61, 62.

With the handle 57 in the position shown in FIG. 3, the spring 63 is compressed and offers a spring load that produces the 150 psi pilot line pressure. With the handle 57 pushed forward, the adjusting rod 56 is slidably retracted and the spring 63 expands to an uncompressed position.

In operation, with the handle 57 in the position shown in FIG. 3, hydraulic fluid enters the cartridge 44 from the passageway 34b through the openings 49. The fluid passes along the surface recess 51 and then divides, part passing through the radial openings 50 to the pilot line 41, and part passing radially inward through the opening 52 to the central bore 53 of piston 48. From here, it passes out through the orifice 54, through the area between the piston 48 and adjusting rod 56, into the chamber 59, through the radial opening 60 and into the return passage 42.

The piston 48 achieves a balanced position as a function of the inlet hydraulic pressure which operates within the piston 48 against the force of biasing spring 63. Depending on the magnitude of inlet pressure, the piston 48 occupies a metering position relative to the radial openings 49, creating a pressure drop which varies with the hydraulic pressure force acting against the spring 63. Because of this metering capability, the hydraulic pressure acting within the central bore 53 and on the left end of the piston 48 as it moves to the right equals 150 psi, which is transmitted to the pilot line 41. If inlet pressure increases, the piston 48 moved further to the right to increase the pressure drop between the radial openings 49 and surface recess 51. If there is a reduction in inlet pressure, this enables the spring 63 to urge the piston 48 further to the left until the desired pilot pressure is reached.

The pilot pressure is used for an operational feature described in detail below which is optional at the discretion of the operator. If the operator chooses not to use this operational feature, the handle 57 is moved forward to retract the adjusting rod 56 and expand the spring 63 as described above. Under these circumstances, inlet pressure causes the piston 48 to move substantially to the right in the absence of the biasing spring force. With the piston 48 in this position, the radial openings 49 are sealed off entirely. Since the central bore 53 of piston 48 communicates with the return line 42 through the orifice 54, chamber 59 and radial openings 60, the hydraulic pressure is able to bleed off and the resulting pilot pressure in pilot line 41 is essentially zero, or at the most a negligible pressure which is insufficient to operate the operational feature. The piston 48 is held in this position by normal leakage of hydraulic fluid, which appears within the central bore 53 and at the left end of piston 48. This leakage pressure cannot increase to any significant magnitude because of the orifice 54, but it is sufficient to maintain the piston 48 in the inlet seal-off position.

With reference to FIG. 1, the first control section 14 is shown to comprise a flow controller represented generally by the numeral 71 which determines the amount of flow necessary to operate the hydraulic actuator 23, a manually operable power spool 72 which variably controls the flow of fluid to and from the actuator 23, first and second automatic spool positioners 73, 74 each of which is capable of maintaining the power spool 72 in a preselected position for a desired period of time, and a check valve represented generally by the numeral 75 which forms part of a control circuit for the variable output hydraulic pump 12.

Figure 4:
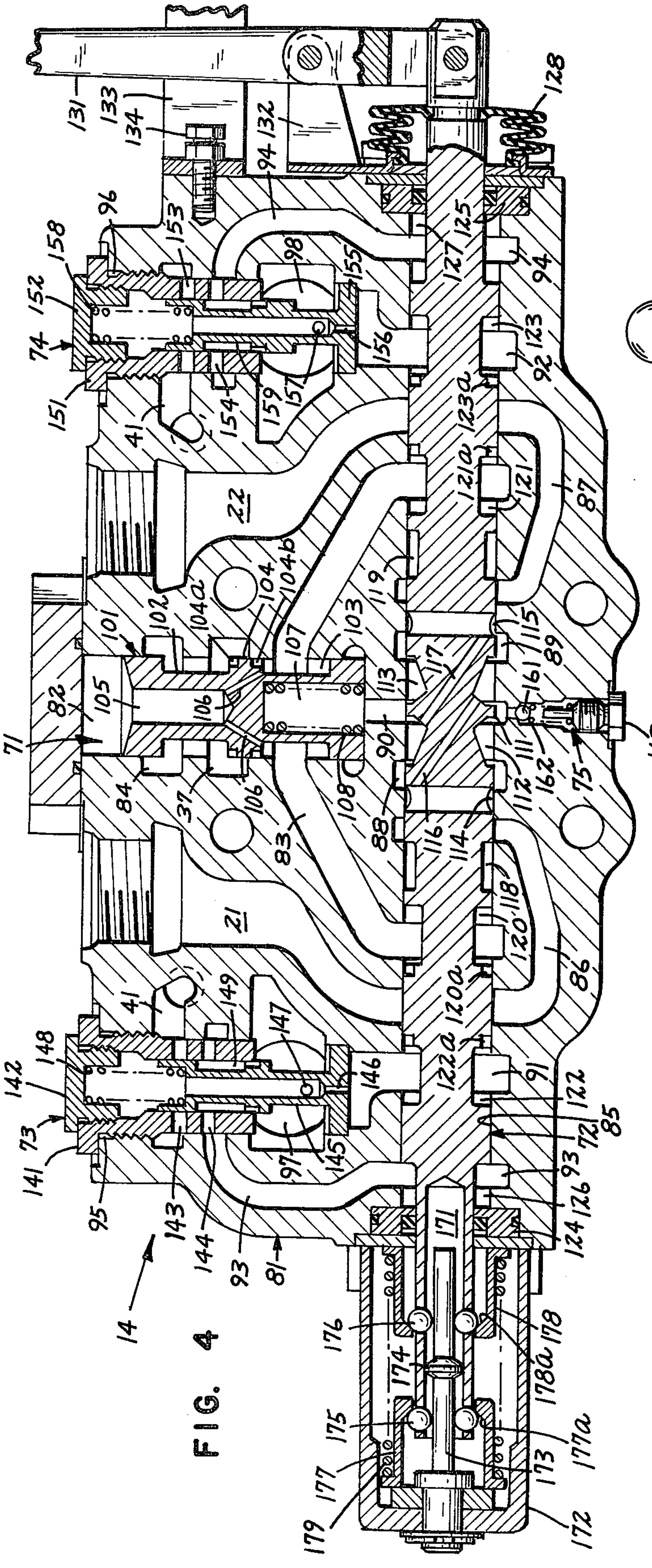
FIG. 4 is a transverse sectional view of one control valve section capable of both four-way and float operation, and including a flow controller and automatic power spool positioners.

With additional reference to FIG. 4, first control section 14 is shown to comprise a body casting 81 in which is formed a number of bores and interconnecting passageways defining the hydraulic circuit shown schematically in FIG. 1. The flow controller 71 is disposed in a vertical bore 82 which is commonly connected to the hydraulic passage 37 leading from the load check 32, a power loop 83 and a downstream passage 84 which leads to the second control section 15 as described below.

Power spool 72 is disposed in a horizontal axial bore 85 formed in the body 81 and is disposed below as well as transverse to the flow controller 71 and automatic spool positioners 73, 74. Axial bore 85 commonly communicates with a number of passages and circumferential grooves, among them the power outlet passages 21, 22 leading to hydraulic actuator 23. A connecting passage 86 leads from the horizontal bore 85 in general alignment with the power outlet passage 21, and a similar connecting passage 87 is symmetrically disposed in relation to the outlet passage 22.

Also communicating with the axial bore 85 are a pair of symmetrically disposed circumferential grooves 88, 89 and a central circumferential groove and passage 90 that extends upwardly to the flow controller 71.

A circumferential groove and passage and return flow chamber 91 leads from the axial bore 85 upwardly to the bottom of automatic spool positioner 73, and a similar, symmetrically disposed passage and return flow chamber 92 extends upwardly to the bottom of automatic spool positioner 74. Each of the passages 91, 92 transmits hydraulic fluid under pressure under certain circumstances to actuate the associated automatic spool positioner.

Another pair of symmetrically disposed circumferential grooves and passages 93, 94 lead from the axial bore 85 to the side of the respective spool positioners 73, 74 for a purpose which will become apparent below.

The automatic spool positioners 73, 74 are respectively disposed in vertical axial bores 95, 96 which are symmetrically disposed relative to the vertical axial bore 82. The bore 95 commonly communicates with the passages 91, 93 described above, as well as the pilot passage 41 and a return passage 97. Similarly, the vertical bore 96 commonly communicates with the passages 92, 94 described above, the pilot passage 41 and a return passage 98.

With continued reference to FIG. 4, the flow controller 71 comprises a piston 101 which is slidably disposed in the vertical bore 82. Piston 101 is formed with first and second spool recesses 102, 103 which are divided by a land 104 having a first set of metering notches 104*a* and a second set of metering notches 104*b*.

Piston 101 is also formed with an upper axial bore 105 which communicates with the spool recess 103 through a plurality of diagonal orifice passages 106. A lower axial bore 107 is formed in the bottom of piston 101 which communicates directly with the central passage 90. A spring 108 is compressibly disposed in the lower bore 107 and serves to normally bias the piston 101 upwardly in the absence of a hydraulic pressure differential across the piston 101.

The power spool 72 is an elongated, single piece member having a plurality of circumferential recesses and passages for controlling the direction and magnitude of flow between the various passages which communicate with the horizontal axial bore 85.

In approximately the longitudinal center of the spool 72 is a small land 111 which divides a pair of irregular circumferential recesses 112, 113. With the spool 72 in the "neutral" position shown in FIG. 4, the land 111 is disposed in registration with the central passage 90, but its width is insufficient to block the passage.

A pair of small circumferential recesses 114, 115 are symmetrically disposed relative to the central land 111 and adjacent the recesses 112, 113. The recess 114 is connected with the recess 113 by a diagonal passage 116, and a similar diagonal passage 117 establishes fluid communication between the recesses 112 and 115. Next adjacent is a pair of symmetrically disposed circumferential recesses 118, 119, and a further pair of recesses 120, 121 are each formed with a set of metering notches 120*a*, 121*a*, respectively. Next adjacent is a pair of symmetrical recesses 122, 123 which are formed with metering notches 122*a*, 123*a*, respectively.

The power spool 72 has a reduced diameter at each end, these reduced regions being respectively supported in suitable bearings 124, 125. The side of bearing 124 and the adjacent land of the power spool 72 define a recess 126 which varies in size as the spool 72 slides to the right and left. A similar recess 127 is formed at the opposite end of the spool 72 adjacent the bearing 125.

The extreme right end of the power spool 72 projects outwardly of the body 81 and carries the usual flexible seal 128.

Figure 5:
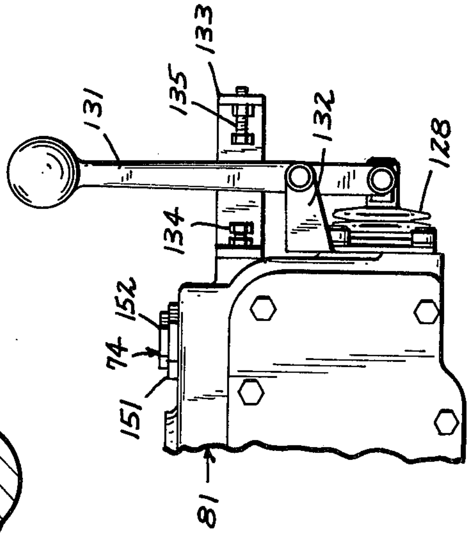
FIG. 5 is a fragmentary view in side elevation of the operator's control handle for the control section of FIG. 4.

With additional reference to FIG. 5, a manually operable handle 131 is pivotally connected to the right end of spool 72. Handle 131 is also pivotally connected to a fixed member 132, so that pushing and pulling of the handle 131 effects sliding movement of the power spool 72 within the horizontal bore 85.

A frame 133 mounted on the body 81 carries a pair of adjustable stops 134, 135 on opposite sides of the handle 131 which limit the movement of handle 131 in each direction.

The automatic spool positioners 73, 74 are structurally identical, and a description of one therefore suffices. As shown in FIG. 4, automatic spool positioner 73 comprises a cartridge 141 which screws into the vertical axial bore 95 in fixed position. The cartridge 141 is generally cylindrical in shape, although it has a somewhat irregular outer surface and an irregular central bore. The upper open end of the cartridge 141 is closed by a threaded plug 142 the underside of which is recessed. Cartridge 141 has a first set of radial openings 143 connecting the inner bore of the cartridge with the pilot line 41, then a second set of radial openings 144 connecting the inner bore of the cartridge with the passage 93.

Slidably disposed in the cartridge 141 is a poppet 145 the lower end of which defines a valve member that can be seated to seal the circumferential groove and passage 91 from the return passage 97.

Poppet 145 has an axial bore extending entirely therethrough, terminating at the lower end in an axial orifice 146 and a radial orifice 147. The upper end of the poppet 145 is recessed in the same manner as the threaded plug 142, and a spring 148 is compressibly disposed therebetween to normally urge the poppet into its closed position.

The side of poppet 145 is formed with a circumferential recess 149 which, depending on its position within the cartridge 141, establishes communication between the radial openings 143, 144, or between the radial openings 144 and return passage 97.

As pointed out above, automatic spool positioner 74 is identical in structure to positioner 73, and includes a cartridge 151, a threaded plug 152, a first set of radial openings 153, a second set of radial openings 154, a poppet 155, an axial orifice 156, a radial orifice 157, a spring 158 and a spool recess 159.

With continued reference to FIG. 4, the shuttle check valve 75 is disposed in a stepped vertical bore positioned immediately below central passage 90, and consists of a ball 161 of sufficient diameter to seal the vertical bore from passage 90. Ball 161 is normally urged to a closed position by a spring 162 which is compressed by a threaded plug 163 which also serves to seal the lower end of the vertical bore. The downstream side of check valve 75 is connected to the signal line 18 (FIG. 1) by an outlet not shown.

Control section 14 is capable of four-way hydraulic operation, and is also constructed for a "float" operation, the function of which will be described below. The float operation is facilitated by the structure at the left end of the control section 14 as viewed in FIG. 4. As shown, the extreme left end of power spool 72, which is of reduced diameter, projects axially beyond the body 81 and is formed with a blind axial bore 171.

An end cap 172 is secured to the body 81 and encloses the projecting spool end. End cap 172 carries a stem 173 which projects into the axial bore 171. Stem 173 is formed with an enlarged detent 174 the diameter of which is sized to slide within the axial bore 171 in guiding relation.

The spool end is formed with a first set of radial openings in which a first set of ball detents 175 are carried, and a second set of radial openings in which a second set of ball detents 176 are carried. A first cup-shaped spring retainer 177 extends between the inner left end of the cap 172 and the ball detents 175. The inner end of the spring 177 which engages the ball detents 175 is chamfered as shown at 177*a*. Similarly, a spring retainer 178 extends between the body 81 and ball detents 176, and is formed with a chamfered surface 178*a*. A spring 179 is compressibly disposed between the spring retainers 177, 178, which urges the spool 72 to the neutral position shown in the absence of other forces.

The control section 14 enables a float operation only when the power spool 72 is fully extended to the right, although it would be possible to define a second float position with the spool 72 fully extended to the left. The float position occurs when the spool 72 is moved to the right a sufficient distance that the ball detents 175 engage the detent member 174. Normally, the balls 175 are urged radially inward into engagement with the stem 173 by reason of the axial force imposed on the retainer 177 by the spring 179, which is translated into a radially inward force by the chamfered surface 177*a*. It will be noted that the radial distance between the outer diameter of the left end of spool 72 and the inside diameter of the spring retainer 177 is sufficient to permit the ball detents 175 to move radially outward a limited amount, but this radial dimension is small enough to prevent the balls 175 from escaping.

Accordingly, when the balls 175 engage the detent 174, further movement of the power spool 72 to the right causes the balls 175 to move radially outward up and over the detent 174, at which point the spool 72 is in the float position. The detent structure enables the operator to sense the position of power spool 72 as it approaches and reaches the float position.

Figure 6:
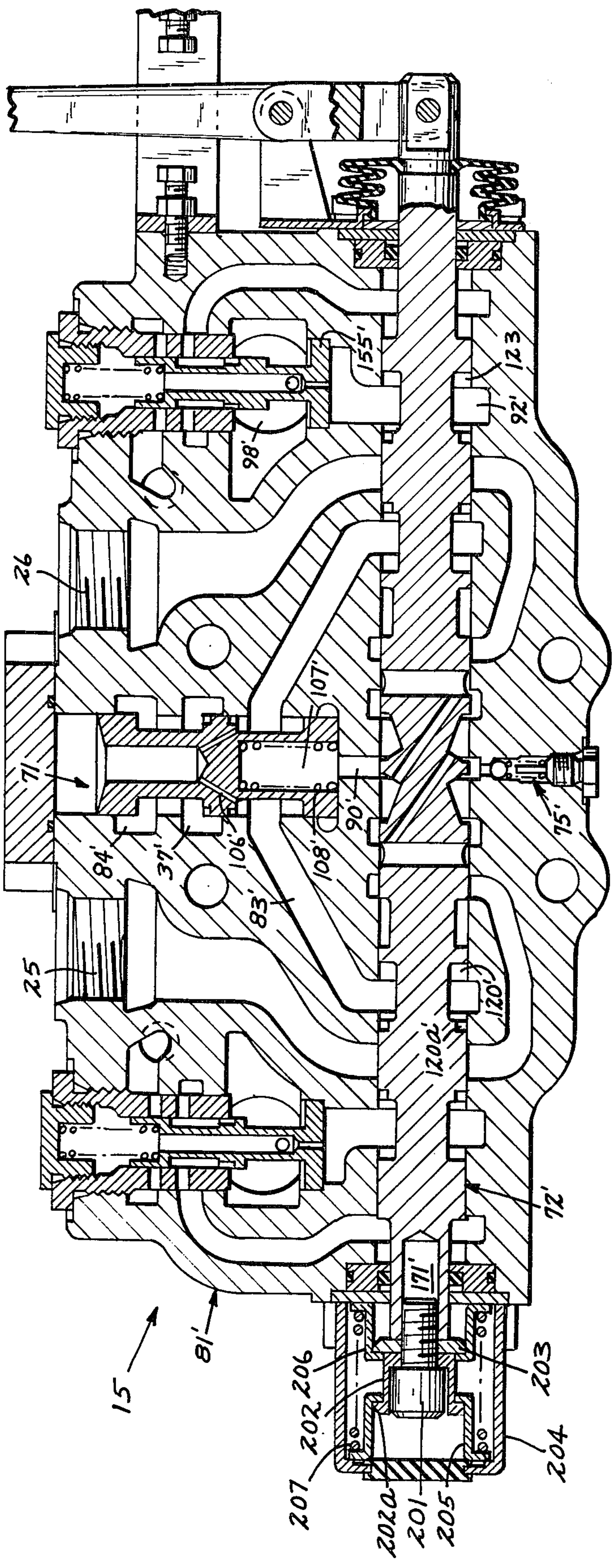
FIG. 6 is a transverse sectional view of another hydraulic control valve section capable of four-way operation, and including a flow controller and automatic power spool positioners.

The second control section 15 is shown in detail in FIG. 6, to which reference is made. A float operation is generally necessary for only one of a plurality of loads, and accordingly, the control section 15 operates only in the fourway mode. However, for purposes of manufacturing efficiency, the construction of control section 15 is identical to that of control section 14, but with certain modifications which preclude movement to the float mode. Consequently, with the exception of the float inhibiting structure and the use of reference numerals 25, 26 for the outlet passages of control section 15, the various components and structure of control section 15 are represented by the same reference numerals as control section 14, but with the addition of a prime symbol. Further, for purposes of clarity, not all of the reference numerals are shown in FIG. 6.

The float inhibiting structure of control section 15 is as follows. The extreme left end of power spool 72′ is somewhat shorter than that of control section 14, as is the blind axial bore 171′. The bore 171′ is threaded to receive an Allen head screw 201. Retained between the head of screw 201 and the left end of power spool 72′ is a cup-shaped carrier 202 having a peripheral lip 202*a*, and an annular carrier disc 203 the outer diameter of which corresponds to that of the peripheral lip 202*a*.

An end cap 204 carried by the body 81′ encloses the projecting end of power spool 72′ and its attendant structure.

A first spring retainer 205 extends between the inner left end of cap 204 and the peripheral lip 202*a*. A second spring retainer 206 extends between the body 81′ and the carrier disc 203. A spring 207 is compressibly disposed between the spring retainers 205, 206, which serves to normally urge the power spool 72′ to the neutral position shown in FIG. 6.

It will be appreciated that the structural components 201–207 do not permit as much axial sliding movement of the power spool 72′ as the structural components 171–179 for the power spool 72.

Variable output hydraulic pump 12 is represented diagrammatically in FIG. 2, to which reference is made. Pump 12 is a commercially available pump the general purpose of which is to provide hydraulic fluid to the multiple section hydraulic control valve 11 at a pressure and flow necessary to operate hydraulic actuators 23, 27 in a desired manner. As will be described below in further detail, the control valve 11 generates a pressure signal through the signal line 18 indicating demand, and the pump 12 responds accordingly, delivering hydraulic fluid through the line 17 at the necessary pressure and flow.

Pump 12 comprises a body 211 carrying a rotatable shaft 212 which may be driven by any suitable means. A rotor 213 is mounted on shaft 212 for rotation therewith, and carries a plurality of piston-cylinder assemblies 214. The piston-cylinder assemblies 214 sequentially move relative to a fluid inlet 215 and the pressurized hydraulic line 17. Fluid enters the piston-cylinder assembly 214 during its inlet stroke through the inlet 215, which is connected to the reservoir 20 through a filter 25*a* (FIG. 1). The piston-cylinder assembly 214 registers with the pressurized hydraulic line 17 during its output stroke.

The length of the stroke of the piston-cylinder assemblies 214 is controlled by a pivoted swash plate 216, which the pistons continously engage under the influence of biasing means not shown. The swash plate 216 is shown in FIG. 2 in a position which effects a minimum stroke on the pistons as they move from the inlet to the outlet position. If the swash plate 216 is rotated about is pivot in a counterclockwise direction as viewed in FIG. 2, it will be appreciated that each of the pistons must move a greater linear distance during the inlet stroke and a greater linear distance in the opposite direction during the output stroke, which results in increased pump output.

The angular position of swash plate 216, and hence the output of the pump 12, is controlled by a pair of opposed pistons 217, 218 which engage the swash plates 216. Piston 217 is provided with a biasing spring 219 which normally urges the swash plate 216 to a maximum angular position. Piston 218 is disposed in a control chamber 220 in which the pressure varies to generate a force opposing piston 217.

The magnitude of pressure in control chamber 220 is controlled by a flow compensator 221, which comprises a spool 222 disposed in an axial bore 223 and having lands 222*a*–222*c*. Spool 12 is normally urged to the left by a spring 224 which is adjustably compressed by a threaded plug 225.

The pressure signal from hydraulic control valve 11 passes through a line 18 to a signal chamber 226 within the flow compensator 221. Pressure in the chamber 226 generates a force on the piston 222 which acts with the force of spring 224. The signal line 18 also communicates with the reservoir 20 through a restriction 227 and return line 228 which may include a filter 228*a* (FIG. 1).

The control of pump 12 also includes a pressure compensator 231 which constitutes a relief valve. Pressure compensator 231 comprises a spool 232 having lands 232*a*, 232*b* disposed in an axial bore 233. Piston 232 is normally urged to the left by a compression spring 234 the force of which is adjustable by a threaded plug 235.

Axial bores 223, 233 are interconnected by passages 236–238. A passage 239 leads from the hydraulic line 17 to the axial bore 223 and passage 36.

Operation of the variable output pump 12 is as follows. Initially assuming a no demand condition, pressure in the signal chamber 226 is the same as return pressure, and therefore minimal. The spring 224 therefore acts alone in urging piston 222 to the left. However, pressure entering the hydraulic line 17 enters the bore 223 through the passage 239, acting against the land 222*a* to urge the spool 222 to the right. Since there is no additional pressure in chamber 226, the system balance is based on the force of spring 224, which in the preferred embodiment creates a minimum pressure of 200 psi in the line 17. This output pump pressure appears in the chamber 220 and is sufficient to maintain the swash plate 216 at the angle shown, which generates the minimum output flow and pressure. The pump 12 will continue to operate at this level, generating only enough flow to make up for leakage inherent within the system.

If a demand condition occurs, pressure in the signal line 18 increases. The restriction 227 is small enough to prevent pressure from bleeding off rapidly, and pressure therefore builds up in signal chamber 226. This acts against the spool 222, moving it to the left. As soon as land 222*a* enters the passage 237, a hydraulic loop is established from the control chamber 220 through the passage 237, axial bore 233, passage 238 and axial bore 223 to the return line 228. It will be appreciated that the position of spool 222 causes metering of hydraulic fluid within this loop, and the pressure in control chamber 220 decreases. When this occurs, the biasing piston 217 urges the swash plate 216 to the left under the influence of spring 219, thus increasing the pump output. This output pressure is, of course, sensed by the land 222*a*, and an opposing force is created which attempts to move a spool 222 to the right. A balance is achieved so that the output pump pressure is always 200 psi greater than the demand pressure signal in line 18, this being the result of adjustment of the spring 224.

Adjustment of the spring 234 establishes the maximum pump output pressure, which for example is 2500 psi. Under this condition, pressure in the signal chamber 226 is at least 2300 psi, which urges the spool 222 to the left, causing pressure in the control chamber 220 to be low. At the same time, pump output pressure is transmitted through the passages 239, 236 to the axial bore 233. When this pressure reaches the preset maximum, the spool 232 is moved to the right until the land 232*a* fully enters the passage 237. At this time, axial bore 233 communicates with the return line 228 through the passage 238 and axial bore 222, the land 222*c* having moved sufficiently to the left to permit flow from the passage 238 to the bore 223.

The balancing of forces across the spools 222, 232 is at this time such that the pressure drops occurring between the land 232*a* and passage 237 and between land 222*c* and passage 238 maintains the pressure and hydraulic line 17 at the preset maximum.

In operation of the system, let it be initially assumed that the pump 12 is in operation, that pressure reducing valve 31 is in its inoperative or blocked position so that pressure in pilot line 41 is negligible, and that the power spools 72, 72' of the control sections 14, 15 are in the neutral position as shown in FIGS. 4, 6, respectively. As such, there is no demand on the pump 12 and it operates at its minimum output level to generate a hydraulic pressure of 200 psi in the line 17. This pressure appears at the inlet 33 of inlet section 13, where it is initially sufficient to open the load check 32, thus producing a hydraulic pressure of 200 psi in the passage 37. However, until a demand is created by either of the power spools 72, 72', the inlet fluid dead ends at the outlet plate 16, and the inlet pressure eventually equalizes across the poppet 35 which causes it to close. The poppet 35 thereafter opens in the neutral condition only to replace the inherent system leakage loss.

With reference to FIG. 4, the hydraulic inlet pressure appearing downstream of the load check 32 is transmitted through passage 37 to the flow controller 71 of the first control section 14. Assuming an initial absence of hydraulic pressure in the system, the piston 101 is urged upward by the spring 108. Consequently, hydraulic fluid under the 200 psi inlet pressure moves from the passage 37 through the spool recess 103 to the power loop 83, where it is dead ended by reason of the neutral position of power spool 72. At the same time, hydraulic fluid moves through the orifices 106 into the upper bore 105, which causes the piston 101 to move downward to the position shown in FIG. 4. The piston 101 will remain in this position so long as there is no demand by movement of the power spool 72, and the piston 101 will be held in the downward position by inherent system leakage.

With the power spool 72 in the neutral position, it will also be observed that the lower axial bore 107 of the piston 101 is at return pressure by reason of the communication through the central passage 90, the irregular spool recesses 112, 113, the diagonal passages 116, 117, the small passages 114, 115 and the return passages 88, 89. Accordingly, there is no hydraulic pressure in the lower axial bore 107 to assist the spring 108 in moving the piston 101 upwardly against the force created by the inlet hydraulic pressure exerted on the top side of piston 101.

The downward position of the piston 101 indicates that the first control section 14 does not have any demand for hydraulic fluid, and full communication is therefore established between the inlet passage 37 and the downstream passage 84, which leads to the flow controller 71' of the second control section 15.

The forces acting on the poppets 145, 155 of the automatic spool positioners 73, 74 causes them both to move to the seated position shown in FIG. 4. With exemplary reference to the spool positioner 73, this follows from the fact that pressure above the poppet 145 is at return pressure by communication through the radial orifice 147, and pressure within the passage 91 is similarly at return pressure by the communication through axial orifice 146 and radial orifice 147. Accordingly, the biasing spring 148 takes precedence and moves the poppet 145 to the seated position shown.

With the poppet 145 in this position, the variable recess 126 also communicates with the return passage 97 through the radial openings 144 and the poppet recess 149. Accordingly, there is no axial force imposed from the recess 126 which would cause the power spool 72 to move. The same holds true for the automatic spool positioner 74.

With reference to FIG. 6, operation of the second control section 15 is identical to that of control section 14 so long as the power spool 72' remains in the neutral position. Thus, the piston 101 is in its lowest position, and hydraulic pressure appearing in the inlet passage 84 is transmitted to the downstream passage 84', where it is dead ended against the outlet plate 16 (FIG. 1).

Similarly, the automatic spool positioners 73', 74' are in their seated positions, and neither produces an axial force on the power spool 72'.

Assume now that the power spool 72 of control section 14 is moved to the full power position to generate full pressure in the outlet line 21 to raise the load 24. Let it be further assumed that the power spool 72' remains in neutral.

Under these conditions, the recess 120 of power spool 72 establishes full communication between the power loop 83 and the outlet passage or work port 21. However, at this instant in time, the power loop 83 is not in communication with pump pressure because the land 104 of piston 101 blocks communication with the inlet passage 37.

The load pressure appearing in the work port 21 is ordinarily of a significant magnitude and would exceed the minimum pump pressure of 200 psi. However, the pressure in work port 21 is also transmitted through the connecting passage 86, small recess 114, diagonal passage 116 and a regular recess 113 to the central passage 90. This increased pressure overcomes the check valve 75, permitting hydraulic fluid to enter the signal line 18 (FIG. 1) at the pressure level created by load 24. This pressure back-biases the check valve 75', the central passage 90' being at return pressure.

The signal pressure in signal line 18 acts on pump 12 in the manner described above, moving the swash plate 216 to an angular position which produces a hydraulic pressure in line 17 equal to the signal pressure plus 200 psi. This increased pressure from pump 12 occurs almost instantaneously, and is immediately applied to the inlet passage 37 of flow controller 71.

At the same time that pressure in the central passage 90 has been acting on the check valve 75, the same pressure appears in lower axial bore 107 of the piston 101, causing it to move upward where pump pressure in the inlet passage 37 may be communicated to the power loop 83 through the recess 103. Since the power spool 72 is in its maximum power position, the pressure appearing in the lower axial bore 107 is sufficient to move the piston 101 to its uppermost position, where the land 104 blocks communication between the inlet passage 37 and the downstream passage 84. This prevents pump pressure from reaching the second control section 15.

At this time, the pressure in power loop 83 is transferred through the diagonal orifice passages 106 and upper axial bore 105 to the top of piston 101. At the same time, the pressure in work port 21 is transferred to the lower axial bore 107 as described above. As long as the difference in pressure between the top and bottom of piston 101 is not sufficient to overcome the force of spring 108, the piston 101 will remain in its uppermost position. The pressure in work port 21 will remain high so long as the power spool 72 is in a position connecting the power loop 83 with the work port 21.

During the time that hydraulic fluid is transferred to one side of the actuator 23 through work port 21, hydraulic fluid also returns from the opposite side of the actuator 23 through the work port 22. This return flow passes through the recess 123 to passage 92, moving the poppet 155 of automatic spool positioner 74 upward so that the return fluid reaches the return port 98.

As soon as the spool 72 is moved back to the neutral position, the lower axial bore 107 communicates with return pressure as described above, and the piston 101 returns to its lower position. Pressure in the central passage 90 also drops to return pressure at this time, which is communicated through the check valve 75 to the signal line 18, causing the pump 12 to reduce its output pressure to 200 psi.

Operation is essentially the same although reversed when the power spool 72 is in a neutral position, and the power spool 72' is in the full power position. Thus, in the first control section 14, the piston 101 of flow controller 71 moves to the lowermost position as shown in FIG. 4 as described above, and pressure is transferred from the inlet passage 37 to the downstream passage 84, where it reaches the flow controller 71' of control section 15.

With the power spool 72' in one of its full power positions, establishing full communication between the power loop 83' and one of the work ports 25, 26, the piston 101' moves to its uppermost position due to the increased pressure in lower axial bore 107'. The work port pressure also appearing in central passage 90' is transferred through the check valve 75' to signal line 18 (FIG. 1) causing pump 12 to increase its output to a level which exceeds the demand pressure by 200 psi. At the same time, the signal pressure in signal line 18 back biases check valve 75 against the return pressure appearing in central passage 90.

It will now be appreciated that the arrangement of check valves 75, 75' permits the highest of the two demand pressures appearing in central passages 90, 90' to be transmitted to the signal line 18 and thereby control the output of variable pump 12. In this manner, the pump 12 always operates at a level which exceeds demand pressure by 200 psi, but never operates more than is necessary.

So long as the power spool 72' is in the full power position, the piston 101' remains in its uppermost position, and pump pressure appearing in the passage 84 is transferred directly to the power loop 83' and the selected work port 25 or 26. If work port 25 has been selected for example, the return flow from actuator 27 passes from work port 26 through recess 123' to passage 92', moving poppet 155' upward to reach the return port 98'.

A return of power spool 72' to the neutral position puts central passage 90' at return pressure, causing piston 101' to move downward and controlling the pump 12 to reduce its output pressure to the minimum level.

It will be noted that the work ports 21, 22 of control section 14 and work ports 25, 26 of control section 15 are dead ended with the spools 72, 72' in the neutral position, so that the actuators 23, 27 may be maintained in any position to which they were actuated.

Let it now be assumed that the power spools 72, 72' are both moved to metering positions; i.e., the metering notches **120*a*, 120*a'* establish fluid communication from the associated power loop to a selected work port. Let it be further assumed that the work ports 21, 25 are selected, and pressure in the work port 21 (which is primarily a function of the associated load) is greater than the pressure in work port 25**.

Under these conditions the pressure at work port 21 is communicated to the lower axial bore 107 as described above, causing the piston 107 to move upwardly. However, since the position of power spool 72 is not at full flow, the piston 101 occupies an intermediate position which permits full fluid flow from the inlet passage 37 to power loop 83, but which also establishes restricted flow from the inlet passage 37 to the downstream passage 84 through the metering notches 104a. Stated otherwise, because the position of power spool 72 does not require full power to the work port 21, this is sensed by the flow controllers 71, which permits a limited amount of hydraulic fluid to pass to the second control section 15.

The intermediate position of the piston 101 is determined as a function of the inlet pressure in inlet 37, selected work port pressure and the force of spring 108, all of which are imposed on the piston 101. It will be recalled that the pump 12 is controlled to generate a pressure of 200 psi greater than the highest work port pressure, and this pressure appears at the inlet 37. The pressure on the top of the piston 101 is the same as pressure in the loop 83 (received through the passages 106), which may be full inlet pressure or less than full pressure if the metering notches 104b come into play. The pressure in bore 107, which acts on the bottom of piston 101, is equal to pressure in the selected work port with the power spool 72 in an operative position. The spring 108 also acts on the bottom of piston 101, and its spring force is chosen to balance the piston 101 so that, with the power spool 72 in the metering position, there will be a pressure drop of no more than 50 psi from the loop 83 to the selected work port 21, 22.

Thus, continuing with the example of greater load pressure appearing in the work port 21 than in the work port 25, it will be appreciated that the pressure of work port 21 will appear in the bore 107, and with the spring 108 will move piston 101 upward. Since work port 21 has the greatest pressure, piston 101 moves upwardly to a point where loop 83 receives the full inlet pressure (i.e., metering notches 104b do not come into play), while metering notches 104a restrict the inlet of fluid entering the passage 84, which is conveyed to control section 15.

As described, operation is such that pressure in the work port 21 determines the output of pump 12 (200 psi greater than work port pressure), and the pressure in loop 83 is always capable of handling the load unless the maximum pump output pressure is reached.

The piston 101' operates in the same manner, utilizing the pressurized hydraulic fluid in passage 84 to satisfy the demand of its selected work port. Because the supply to passage 84 is restricted by piston 101, the pressure transmitted to the top of piston 101' will be less. Coupled with the load pressure in work port 25, which appears in bore 107', piston 101' will be moved to its uppermost position to transfer all of the hydraulic fluid in passage 84 to power loop 83' without restriction. As the load diminishes and pressure in bore 107' decreases, piston 101' adjusts itself accordingly, insuring that the pressure drop from the loop 83' to the selected work port 25 is never more than 50 psi.

If the pressure in selected work port 25 is or becomes greater than that in selected work port 21, this pressure immediately governs the output of pump 12 by the shuttle system of check valves 75, 75'.

This condition will also cause a reversal of positions of pistons 101, 101'. Inlet pressure as demanded by work port 25 appears in inlet 37 and is transferred in whole or in part to the top of piston 101. Because the pressure in work port 21 and bore 107 is decreased, the piston 101 moves down to a point where the metering notches 104b come into play, transferring the inlet hydraulic fluid under full pressure to the passage 84 and second control section 15.

The piston 101' responds to this inlet pressure and the work port pressure to satisfy the load demand as required, as described above.

Although the foregoing examples have been based on the flow of hydraulic fluid from the power loops 83, 83' to the work ports 21, 25, respectively, and with return flow through the work ports 22, 26, respectively, it will be appreciated that the power spools 72, 72' are symmetrically constructed and similar movement in the opposite direction will effect a reverse flow; e.g., from the power loop 83 through the work port 22 to the actuator 23, and from the actuator 23 through the work port 21 to return.

The automatic spool positioning feature is available for each of the control sections 14, 15 and enables the operator to move either or both of the power spools 72, 72' to a preselected position which will be maintained until the desired operation is completed.

The automatic spool positioning feature results from movement of the handle 57 of pressure reducing valve 31 to the position shown in FIG. 3, which generates a pilot pressure of 150 psi in the pilot line 41. As shown in FIG. 1, this pilot line pressure is transmitted directly to each of the automatic spool positioners 73, 74 of control section 14 and automatic spool positioners 73', 74' of control section 15. Operation is the same for each, and will be described only in connection with the automatic spool positioners 73, 74 of FIG. 4.

The operator initially determines the preselected positions of the spool 72 for the desired flow to the actuated device. As an example, the preselected positions may be the full flow positions to each of the work ports 21, 22. The adjustable stops 134, 135 (FIG. 5) are accordingly adjusted, so that handle 131 will engage stop 134 when the spool 72 transmits full flow from the loop 83 to the work port 22, and will engage stop 135 when 72 transmits full flow from the loop 83 to the work port 21.

Assuming that the operator moves the handle 131 to a position engaging the stop 135, the piston 101 moves to its uppermost position as described above and the pump flow is transmitted directly to the work port 21. As the actuator 23 begins to move the load 24 upward, hydraulic fluid immediately begins flowing from the actuator 23 through the work port 22. As described above, this fluid moves through the recess 123 and into the passage and return flow chamber 92, where it urges the poppet 155 upward, which permits the fluid to enter the return port 98.

The poppet 155 remains in an upper position so long as hydraulic fluid continues to flow from the actuator 23. With the poppet 155 in the upper position, the pilot pressure appearing in passage 41 enters the first set of radial openings 153, passes through the poppet recess 159, out of the recess set of radial openings 154, through the passage 94 and into the recess 127, which serves as a pressure control chamber. This creates an axial force on spool 72 that acts against the adjacent land and maintains the spool 72 in the full flow position. At this time, and as viewed in FIG. 4, the spool cannot move further to the left because of the stop 135, and it is maintained in such position by the pressure in chamber 127.

As soon as the actuator 23 reaches its limit, the return flow in passage 92 stops, and poppet 155 returns to its seated position under the influence of spring 158. In this position, poppet 155 blocks the radial openings 153 so that pilot pressure in the passage 41 is blocked, and at the same time opens passage 94 in chamber 127 to return line pressure through the radial openings 154, poppet recess 159 and return port 98. The pressure in chamber 127 having been reduced, spring 179 urges the spool 72 back to the neutral position shown in FIG. 4.

Operation of the automatic spool positioners 73, 73' and 74' is the same.

The use of flow controllers 71, 71' with automatic spool positioners 73, 74 and 73', 74', respectively, is particularly advantageous since it insures a constant flow of hydraulic fluid to the load notwithstanding variations in pressure within the system. Often, the load on a hydraulic actuator increases significantly through the power stroke, and in the absence of a flow controlling device the flow of hydraulic fluid, and hence movement of the load, decreases undesirably. However, as described in detail above, the pressure in any work port to which hydraulic fluid is supplied is always transmitted back to the flow controller (lower axial bores 107, 107'), which has the effect of driving the associated piston 101, 101' upwardly to divert more hydraulic fluid as is needed. The highest work port pressure is also transmitted through the signal line 18 to govern the output of pump 12, thus insuring that hydraulic fluid is supplied at the desired flow and pressure up to its maximum output.

Accordingly, whenever the power spool handles 131, 131' are moved to a preselected stop position, further operation not only is fully automatic due to the operation of the automatic spool positioners, but actuation of the load is uniform because the flow of hydraulic fluid to the actuator is constant.

Power spool 72 of control section 14 may also be moved to a "float" position which, as described above, occurs when the balls 175 pass over the detent 174. In this position, the recess 122 of power spool 72 registers with the work port 21 and establishes fluid communication with passage 86. Work port 22 is also at this time connected with return pressure through the passage 87, irregular spool recess 113 and return 89. Thus, the work load pushes hydraulic fluid into the work port 21 which leads to the reservoir 20, and hydraulic fluid is withdrawn from the reservoir 20 through work port 22 into the opposite side of the actuator 23.

Also at this time, the power loop 83 is fully blocked by the power spool 72, and the pressure at inlet 37 causes the piston 101 to move down and direct all flow to the downstream passage 84.

What is claimed is:

1. Hydraulic control apparatus comprising:

(a) a plurality of valve control sections each of which comprises (i) a valve body defining an inlet adapted for connection to variable output pumping means, at least one work port adapted for connection to a hydraulically actuated device, and a signal pressure outlet;

(ii) power spool means for selectively blocking and establishing fluid communication under variable pressure between the inlet and the associated work port;

(iii) a signal pressure chamber;

(iv) control means for establishing fluid communication between the work port and signal pressure chamber when the power spool means connects the inlet to the work port;

(v) and check valve means constructed and arranged to permit the flow of hydraulic fluid only from the signal pressure chamber to the signal pressure outlet;

(b) the signal pressure outlets of the respective valve sections being commonly connected to define a signal pressure line for transmitting the largest of the plurality of signal pressures.

2. The apparatus defined by claim 1, wherein the control means establishes fluid communication between the return outlet and the signal pressure chamber when the inlet and work port are not connected by the power spool means.

3. The apparatus defined by claim 2, wherein the control means comprises the power spool means.

4. A hydraulic control system comprising:

(a) variable output pumping means having an outlet and a signal inlet adapted to receive a signal pressure for varying the pumping means output;

(b) a plurality of hydraulic valve control sections each of which comprises (i) a valve body defining an inlet connected to the pumping means outlet, at least one work port adapted for connection to a hydraulically actuated device and a signal pressure outlet;

(ii) power spool means for selectively blocking and establishing fluid communication under variable pressure between the inlet and the associated work port;

(iii) a signal pressure chamber;

(iv) control means for establishing fluid communication between the work port and signal pressure chamber when the power spool means connects the inlet to the work port;

(v) and check valve means constructed and arranged to permit the flow of hydraulic fluid only from the signal pressure chamber to the signal pressure outlet;

(c) the signal pressure outlets of the respective valve sections being commonly connected to the signal inlet of the variable output pumping means, whereby the greatest signal pressure of the plurality of valve control sections is transmitted to and controls the pumping means.

5. The hydraulic control system defined by claim 4, wherein the control means of each valve control section establishes fluid communication between the return outlet and the signal pressure chamber when the inlet and work port are not connected by the power spool means.

6. The hydraulic control system defined by claim 5, wherein the control means of each valve control section comprises the power spool means.

* * * * *

UNITED STATES PATENT AND TRADEMARK OFFICE

CERTIFICATE OF CORRECTION

PATENT NO. : 4,129,987

DATED : December 19, 1978

INVENTOR(S) : Nicholas C. Blume

It is certified that error appears in the above-identified patent and that said Letters Patent are hereby corrected as shown below:

Abstract, line 3, "conjuction" should be --conjunction--.

Column 2, line 9, the word "is" should be changed to the word --it--.

Column 7, line 1, after the word "spring" insert the word --retainer--.

Column 12, line 63, the numeral "107" should be changed to the numeral --101--.

Signed and Sealed this

*Eighth* Day of *May 1979*

[SEAL]

*Attest:*

RUTH C. MASON
*Attesting Officer*

DONALD W. BANNER
*Commissioner of Patents and Trademarks*